United States Patent [19]

Tandy

[11] Patent Number: 4,592,917

[45] Date of Patent: Jun. 3, 1986

[54] CHICKEN FLAVORANTS AND PROCESSES FOR PREPARING THEM

[75] Inventor: John S. Tandy, Litchfield, Conn.

[73] Assignee: Nestec S.A., Vevey, Switzerland

[21] Appl. No.: 729,275

[22] Filed: May 1, 1985

Related U.S. Application Data

[63] Continuation-in-part of Ser. No. 600,979, Apr. 16, 1984, abandoned.

[51] Int. Cl.$^4$ ............................................. A23L 1/231
[52] U.S. Cl. ................................................... 426/533
[58] Field of Search ......................................... 426/533

[56] References Cited

U.S. PATENT DOCUMENTS

| | | | |
|---|---|---|---|
| 2,934,437 | 4/1960 | Morton et al. | 426/533 |
| 3,532,514 | 10/1970 | May | 426/533 |
| 3,620,772 | 11/1971 | Kitada et al. | 426/533 |
| 3,660,114 | 5/1972 | Thomas | 426/533 |
| 4,081,565 | 3/1978 | Chhuy et al. | 426/533 |
| 4,194,017 | 3/1980 | Poiger et al. | 426/533 |

OTHER PUBLICATIONS

Pyler, Baking Science & Technology, vol. I, 1973, Siebel Publ. Co.; Chicago, p. 107.

*Primary Examiner*—Joseph Golian
*Attorney, Agent, or Firm*—Vogt and O'Donnell

[57] ABSTRACT

Chicken flavorants having a high intensity are prepared by reacting a mixture of leucine and/or its salts with a sulfur-containing compound and a reducing saccharide in the presence of a hydroxylated solvent.

10 Claims, No Drawings

CHICKEN FLAVORANTS AND PROCESSES FOR PREPARING THEM

This application is a continuation-in-part of copending application Serial No. 06/600,979 filed April 16, 1984, now abandoned.

BACKGROUND OF THE INVENTION

1. Field of the Invention

The present invention pertains to the field of flavorants and particularly pertains to chicken flavorants and processes for preparing the same.

2. Description of Related Art

Flavoring agents which simulate the flavor and aroma of cooked meat may be added to foodstuffs to impart or enhance meat-like organoleptic qualities. Various expedients have been suggested in the prior art to provide flavoring agents which have organoleptic profiles resembling cooked meat. For example, U.S. Pat. No. 2,934,437 (and corresponding British Patent Specification No. 836,694) describes the preparation of a meat-like flavorant by the reaction of a mixture of a monosaccharide and the sulfur-containing amino acids cysteine and cystine, and indicates that more "full-bodied" flavors may be obtained by adding other amino acids to the reaction mixture. U.S. Pat. No. 3,394,015 describes the preparation of a meat-like flavorant from the reaction of a proteinaceous substance with a sulfur-containing compound in the absence of a monosaccharide. These references, however, do not teach preparation of a flavorant having the specific organoleptic profile of chicken, as opposed to a general meat flavorant.

U.S. Pat. No. 3,394,017 describes the preparation of a meat flavorant by reacting thiamine with a sulfur-containing polypeptide, or an amino acid mixture derived from the polypeptide, and thereafter adding aldehydes and ketones to the product. This patent mentions, without further elucidation, that nuances of beef, chicken or pork may be obtained, depending upon the exact choice of reactants or their proportions. U.S. Pat. No. 4,081,565 offers a similarly general suggestion that the presence of saccharides in a Maillard-type reaction mass may give rise to sweet meat flavor characteristics, such as poultry or sweet pork nuances. U.S. Pat. No. 3,532,514 describes the preparation of meat-like flavorants from a mixture of an amino acid source, a mono-, di-, tri-, or polysaccharide and an animal or vegetable fat. This patent indicates that a cooked chicken flavor may be obtained by incorporating lard in the reaction mixture. Finally, U.S. Pat. No. 3,660,114 indicates that a chicken flavor may be obtained by reacting a hexose or pentose with cystine or cysteine and a particular amount of glycine, neutralizing the reaction mixture and heating at an elevated temperature.

However, prior to the present invention there have been needs for improved species-specific chicken flavorants and processes for making the same.

SUMMARY OF THE INVENTION

The present invention provides chicken flavorants and production processes which address those needs. The present invention incorporates the discovery that reactions among amino acids, sulfur-containing compounds and reducing saccharides in the presence of a hydroxylated solvent, previously thought to yield only a general meaty flavor, can provide flavorants with the species-specific flavor of chicken if the reaction mixture includes at least about 0.5 parts by weight of the specific amino acid leucine and/or its salts per part by weight of saccharide, and if the amounts of sulfur-containing compound and saccharide are selected such that the molar ratio of active sulfur to saccharide is more than 2:1 but not more than about 7:1.

The discovery that leucine has special significance in production of chicken flavorants is especially surprising, inasmuch as leucine has long been associated with the preparation of either bread or cheese flavorants, or with production of a "more full-bodied" general meaty flavor in the process of the aforementioned U.S. Pat. No.2,934,437. The discovery that a particular ratio of active sulfur to reducing saccharide is also necessary to obtain a species-specific chicken flavorant is likewise surprising, inasmuch as the prior art does not suggest that adjustment of this particular parameter might lead to a specific chicken flavorant.

In a process according to the present invention, the required quantities of leucine, active sulfur-containing substance and reducing saccharide are reacted in a mixture including the hydroxylated solvent, typically at elevated temperatures. By varying the reaction time, reaction temperature and quantity of solvent in the mixture, the organoleptic profile of the resulting flavorant may be adjusted to simulate the flavor notes of natural cooked, roasted, or fried light or dark chicken meat, as desired.

The chicken flavorants of the present invention are characterized by high intensity, up to 4 times greater than the flavor and aroma intensity of natural cooked, fried or roast chicken meat when compared on a dry solids basis. The chicken flavorants of the present invention typically exhibit excellent heat processing stability. The preferred flavorants according to the invention exhibit shelf stability for over one year at room temperature and hence do not require refrigeration.

The present invention incorporates the further discovery that addition of serine to the reaction mixture enhances and intensifies the chicken flavorants produced.

Hydrolyzed animal or plant proteins added to the flavorant provide a more full-bodied, or rounded-out, flavor and provide a matrix further to improve flavor retention over time. Addition of chicken fat to the flavorant provides an even more characteristic chicken profile and richness, and provides a pleasant mouth-feel.

DETAILED DESCRIPTION OF THE PREFERRED EMBODIMENTS

In a process according to the present invention, a reducing saccharide, an active sulfur-containing substance and leucine and/or its salts are reacted in a reaction mixture which includes a hydroxylated solvent.

The reducing saccharide preferably is a monosaccharide or a mixture of monosaccharides. Any reducing monosaccharide may be employed in the present invention. These include, but are not limited to, hexoses and/or pentoses, either alone or in combination with one another. Typical hexoses include mannose, glucose, galactose, talose, gulose, idose, 6-deoxy-L-mannose, 6-deoxy-L-galactose, etc. Typical pentoses include ribose, arabinose, lyxose, xylose, etc.

Typically, the reducing monosaccharides are added as such to the reaction mixture. However, the reducing monosaccharides may be formed in situ in the reaction mixture from saccharide derivatives or certain disaccharides which are susceptible to cleavage under the conditions of the reaction. For example, 1 mole of sucrose may be added to the reaction mixture and cleaved in the reaction mixture at a low pH to provide 1 mole of glucose and 1 mole of fructose for reaction with the other constituents. Reducing disaccharides which do not cleave to monosaccharides may also be employed. Thus, disaccharides such as lactose will not cleave to monosaccharides if the reaction mixture is maintained at a moderate pH. Addition of 1 mole of such a disaccharide to a reaction mixture maintained under non-cleaving conditions provides 1 mole of the original disaccharide for reaction with the other components.

As used in this disclosure, the term "active sulfur-containing substance" includes a compound or mixture of compounds which include a sulfur moiety capable of reacting with the other constituents under the conditions of the reaction. Inorganic active sulfur-containing substances include, but are not limited to, compounds such as hydrogen sulfide and the sulfides and hydrosulfides of alkali or alkaline-earth metals or ammonia. Organic active sulfur-containing substances include, but are not limited to, 2-aminoethanesulfonic acid, and it salts, lower alkyl mercaptans, lower alkyl sulfides and disulfides. The preferred active sulfur-containing compounds are sulfur-containing amino acids and their salts. Included in this class are methionine, cysteine and cystine, the latter two being particularly preferred. If methionine is employed, it should be used in conjunction with another active sulfur-containing compound. The active sulfur-containing compounds also include more complex compounds capable of liberating the aforementioned active sulfur-containing compounds under the conditions of the reaction. Thus, peptides and polypeptides which contain sulfur-containing amino acids may also be employed. A preferred peptide is the tripeptide glutathione, which contains cysteine. Also the vitamin thiamine may be utilized. Mixtures of active sulfur-containing compounds may also be derived from plants of the *allium* or *cruciferae* species.

Molar quantities of active sulfur stated in this disclosure refer to the reactable sulfur moiety incorporated in the active sulfur-containing substance. Thus, one mole of a monofunctional lower alkyl mercaptan provides one mole of active sulfur, whereas one mole of difunctional mercaptan having two thiol groups per molecule provides two moles of active sulfur.

The preferred hydroxylated solvent in the reaction mixture is water, but other hydroxylated solvents such as ethanol, glycerol and propylene glycol may also be employed. Typically, the amount of solvent is between about 10% to 50% by weight of the reaction mixture and preferably is about 20% to 30% by weight of the reaction mixture.

To obtain satisfactory chicken flavor utilizing the reactants identified above, the active sulfur-containing substance must provide more than two moles of active sulfur per mole of reducing saccharide. Molar ratios of active sulfur to saccharide in excess of 7:1 tend to impart an unacceptable sulfur taste and odor to the product. Molar ratios of active sulfur to saccharide of from 3:1 to 6:1 provide quite acceptable flavors and ratios of from 4:1 to 5:1 are preferred.

Also, to obtain a satisfactory chicken flavor, at least 0.5 parts by weight of leucine and/or its salts must be provided per part by weight of the reducing saccharide. The strength of the chicken flavor increases with increasing amounts of leucine. A leucine:saccharide ratio of from about 1.5:1 to 2.5:1 is preferred. Amounts up to at least 5 parts by weight of leucine and/or its salts per part by weight of reducing saccharide may be employed, but the effect of added leucine diminishes at leucine:saccharide ratios greater than about 5:1, as additive effects become essentially imperceptible at ratios greater than about 5:1, although greater leucine:saccharide ratios may be employed without adverse effects.

Ordinarily, all of the constituents of the reaction mixture are added to the reaction mixture before the reaction commences. However, it is also possible to add or evolve the reactants progressively during the reaction. For example, the active sulfur-containing compound hydrogen sulfide may be bubbled into the reaction mixture during the reaction. Also, reducing monosaccharides may be evolved from cleavage of disaccharides during the reaction. Thus, references in this disclosure to providing or reacting specified amounts of reactants in the reaction mixture should be understood as including progressive addition or evolution of the specified amounts of reactants as well as addition of the full amounts before the reaction.

The reaction is carried out at elevated temperatures, normally from about 50° C. to about 130° C. and, more preferably, from about 90° C. to about 110° C. Elevated pressures may be utilized.

The reaction can be carried out at a pH of about 1 to about 8 with a pH of from about 3.5 to 6.5 ordinarily being preferred. At lower pH values, the reactants tend to solubilize more readily and completely thereby reducing the required reaction time. If a monosaccharide is to be evolved in situ by cleavage of a disaccharide, it is desirable to adjust the pH to a very low value, as about 1, towards the beginning of the reaction to promote cleavage, and then readjust the pH to the 3.5–6.5 range and conduct the remainder of the reaction in that range. After the reaction is complete, the pH preferably is adjusted to a value of from 5 to 7 and preferably from about 5.5 to 6.5, regardless of what the pH may have been during the reaction. The pH may be adjusted by adding known food acceptable acids or bases.

The reaction is carried out until a desired organoleptic profile is obtained, typically for about 0.5 to 4.0 hours and preferably, from about 1.0 to 1.5 hours. During the reaction, the reaction mixture becomes progressively darker. Such color development can be determined by sight or measured by analytical instruments well known to those skilled in the art, such as a spectrophotometer. For any given reaction mixture under given reaction conditions, there is a correlation between organoleptic profile and color development during the reaction. Darker colors are associated with more complete reaction and hence with roast chicken flavor notes, whereas lighter colors are associated with less complete reaction and hence with cooked chicken flavors.

By varying the parameters of temperature, time, and solvent content within the ranges set forth above, it is possible to alter the organoleptic profile of the resulting chicken flavorant to provide cooked white meat chicken flavor characteristics, cooked dark meat chicken flavor characteristics, or roast or fried chicken meat flavor characteristics as desired. Generally, higher temperatures, longer reaction times, and lesser quantities of solvent in the reaction mixture tend to favor production of a flavorant with a roast or fried chicken flavor profile. Conversely, lower temperatures, shorter reaction times and greater quantities of solvent present tend to favor production of a chicken flavorant having a cooked chicken flavor profile. Thus, for example, at 100° C. and at a solvent content of 20% by weight and with a reaction time of about 45 to 60 minutes, a cooked chicken meat flavorant is generated. By keeping all of the parameters constant and simply raising the temperature to about 110° C., a roast chicken flavorant is produced.

In the context of the present specification, it is understood that a cooked white meat chicken flavorant is characteristic of the particular flavor and aroma profile imparted to those portions of a chicken having predominantly light flesh by means of a heating process such as boiling, stewing, baking and the like. The cooked dark meat flavor is, of course, characteristic of cooking those chicken parts which have predominantly dark flesh and is described as having a "fattier" or "mustier" flavor note than cooked white meat. The roasted or fried chicken flavorant of the present invention has an organoleptic profile which is characteristic of naturally roasted or broiled chicken, particularly, roasted or broiled chicken skins.

Addition of serine to the reaction mixture, preferably in amounts up to about 1 part by weight serine per part by weight leucine, enhances the organoleptic profile of the flavorant. Thus, if the reaction conditions are selected to produce a cooked white meat flavorant without serine, addition of serine will enhance the cooked white meat flavor. Addition of serine is particularly desirable in production of a roast chicken flavor, as the roast flavor notes produced at relatively long reaction times, high temperatures and low solvent quantities are particularly enhanced by serine.

After the reaction is complete, the flavorant may be used as is, or may be recovered from solution by any conventional means such as by spray-drying, vacuum-drying, freeze-drying, and the like. The reaction product may be dried with a conventional carrier system such as malto-dextrin, dextrins, or modified starches, the quantity of such a carrier being dictated by the solvent concentration of the reaction medium.

To enhance and intensify the profile of the chicken flavorants produced by the present invention, chicken fat may be added to the flavorant, as by adding the chicken fat to the reaction mixture or by adding the fat to the product after reaction. Addition of chicken fat tends to produce flavorants which are more characteristic of dark chicken meat, and also improves the texture or mouth-feel of the flavorant. Generally, the amount of fat employed may vary between 1.5% to 30% by weight based on the total weight of the reaction mixture, with amounts of from 5% to 10% being preferred.

To obtain a more full-bodied flavor and to provide a matrix for effectively carrying the flavor and retaining its intensity over time, hydrolyzed animal or plant proteins may be added to the flavorant. Although protein hydrolysates may be added to the mixture before or during the reaction, it is preferred to add hydrolysates after the reaction to avoid the possibility of undesirable side reactions involving the hydrolysate. Hydrolysates are well known and are readily obtained from a variety of proteinaceous materials. Vegetable protein hydrolysates, for example, may be obtained from wheat germ, corn gluten, soy protein, linseed protein, peanut press cake, yeast and the like. Meat protein hydrolysates can be derived from any meat source such as chicken, beef, lamb, pork, fish, and the like. Meat protein hydrolysate derived from chicken meat is preferred. The amount of protein hydrolysate employed in the present invention preferably is about 10 to about 90% by weight based on the total weight of the reaction mixture, with 60 to 80% being more preferred.

Flavor potentiators or enhancers such as spices, condiments, monosodium glutamate, 5'-nucleotides and the like may also be combined with the chicken flavorant. Some of these additives may be combined with the mixture prior to or during the reaction, but it is preferred to add them after the reaction.

The chicken flavorants of the present invention may be incorporated in soups and soup mixes, casserole dishes, canned and frozen vegetables, animal or pet foods, sauces, gravies, stews, simulated chicken meat products such as those based on vegetable proteins, chicken meat spreads and dips, bakery products, and the like. The amount of chicken flavorant utilized in these products will be dependent, of course, upon the specific application. Generally, however, an amount of from about 0.1 to 4.0% by weight of chicken flavorant produced by the present invention and preferably, about 0.5 to 1.0% by weight is usually sufficient to impart the desired chicken flavor and aroma characteristics to the foodstuff.

As the present flavorants are intended for use in foods, references to classes of substances as suitable ingredients in this disclosure should be understood as referring to the food-acceptable members of such classes. Food-acceptable substances are those which, when used for purposes as stated herein, will not render the flavorant toxic. Also, references to amino acids, saccharides and other compounds having optically-active stereoisomers should be understood as including all stereoisomers of the compounds in question and mixtures of such stereoisomers inasmuch as all work equally well in the process of the present The following Examples are set forth to illustrate the invention but should not be construed as limiting the invention in any manner. The parts and percentages set forth in the examples are by weight.

EXAMPLE 1

A chicken flavorant having the characteristic flavor and aroma of freshly cooked white chicken meat is prepared from a reaction mixture including the following constituents:

L-Cysteine: 3.00 gm
L-Leucine: 1.50 gm
L-Arabinose: 0.20 gm
Glucose: 0.45 gm
Water: 5.00 gm The molar ratio of sulfur from the cysteine to the monosaccharide is approximately 5:1.

The constituents are mixed together and heated to 85° C. for 1 hour at an initial pH of 5.0.

When the reaction is complete, the pH is adjusted to 6.0 by using sodium hydroxide.

The reacted mixture is then dried by vacuum tray drying to a solids content of about 98% by weight.

The resulting flavorant has an intense, characteristic flavor and aroma of freshly boiled white chicken meat.

EXAMPLE 2

In this Example, the same reaction mixture as in Example 1 is employed, but the mixture is heated to 100° C. for 1½ hours in a vessel equipped with a reflux condenser to reduce the loss of water and volatiles during reaction. Following the reaction, the product is blended with the following additives:
Hydrolyzed corn protein: 73.75 gm
Chicken fat: 1.50 gm
Disodium inosinate: 0.30 gm
Disodium guanylate: 0.30 gm
Water: 11.00 gm As a result of blending the various additives to the reaction product, a paste is formed whose pH is adjusted to a value of between 5.5 and 6.0. The flavorant is then recovered by vacuum tray drying to a solids content of 98% by weight.

The addition of the amino acids of the protein hydrolysate to the reaction product results in a background, general meaty note. Furthermore, the overall impression of chicken flavor is enhanced by the addition of the hydrolysate, fat and nucleotides.

When compared to the chicken flavorant prepared in Example 1, the dried chicken flavor of the present Example has a richer and more full-bodied flavor and has an organoleptic profile which is even more characteristic of natural cooked white meat chicken.

EXAMPLE 3

(COMPARISON EXAMPLE)

This Example is not in accordance with the process of the present invention. Here, the process is carried out without the presence of leucine.

The process of Example 2 is identically repeated with the only exception being that leucine is not present. All of the other constituents including the chicken fat, hydrolyzed corn protein, etc., are present and all of the processing variables remain the same.

The resulting reaction product, when dried, has a pleasant "hydrolyzed protein/sulfur" note but is not reminiscent of cooked chicken meat at all. In other words, without leucine present, a chicken flavorant is simply not produced.

EXAMPLE 4

The process of Example 2 is once again repeated with the only exception being that the glucose is replaced with 0.45 gm of 6-deoxy-L-mannose also known as (L-rhamnose). All of the remaining constituents and reaction steps remain the same.

The resulting dried product has the desirable white chicken meat organoleptic profile of the flavorant produced in Example 2. However, it is approximately two times as intense.

EXAMPLE 5

The process of Example 2 is once again repeated with the only exception being that 1.50 gms of L-serine are added to the reaction mixture before the reaction. The chicken flavorant produced in this Example, when compared to the flavorant produced in Example 2, has an even more characteristic white meat chicken flavor.

EXAMPLE 6

A chicken flavorant having a roasted chicken meat profile is prepared from a reaction mixture including the following constituents:
L-Cystine: 1.50 gm
L-Leucine: 1.50 gm
L-Serine: 1.50 gm
L-Arabinose: 0.20 gm :
Glucose: 0.45 gm
Water: 3.00 gm The reaction mixture having a pH of 4.5 is heated to a temperature of 105° C. for 1½ hours in a vessel equipped with a reflux condenser to retain water and volatiles during the reaction.

Following the reaction, the product is blended with the following additives:
Hydrolyzed corn protein: 52.85 gm
Chicken fat: 1.50 gm
Malto-dextrin: 25.00 gm
Water: 11.00 gm The pH of the resulting paste is then adjusted to a value of between 5.5 and 6.0 and the paste is then vacuum tray dried to a solids content of 98% by weight.

The protein hydrolysate and remaining additives provide a non-specific background meaty note which helps impart a more complete profile when blended with the highly specific chicken reaction product.

The resulting dried product has the flavor and aroma of roasted chicken meat which is most similar in profile to that of freshly broiled chicken skins.

EXAMPLE 7

In this Example, the heat processing stability of the flavorant produced by the present invention is demonstrated.

The chicken flavorant produced in Example 5 is added to a cream of chicken soup base in an amount of 0.5% by weight based on the total weight and heat processed in a sealed can.

Heat processing is accomplished using a rotary retort apparatus at approximately 115° C. for about ½ hour.

After the heat processing step, the product is evaluated by comparison with the flavored soup base prior to processing. The heat treated product shows excellent heat processing stability and has lost little of its chicken meat flavor intensity. In addition, there are no off-flavor notes detectable in the heat processed product.

EXAMPLE 8

A chicken flavorant having the characteristic flavor and aroma of freshly cooked white chicken meat is prepared from a reaction mixture including the following constituents:
L-Cysteine HCl: 3.00 gm
L-Leucine HCl: 1.50 gm
L-Arabinose: 0.20 gm
Glucose: 0.45 gm
Water: 5.00 gm The constituents are mixed together and heated to 85° C. for 1 hour at a pH of 4.5. Following reaction, the pH is adjusted to between 5.5 and 6.0 using sodium hydroxide.

The resulting flavorant has the aroma and flavor of freshly cooked chicken.

EXAMPLE 9

A chicken flavorant having the characteristic flavor and aroma of freshly roasted chicken, more specifically roasted chicken skin, is prepared from a reaction mixture including the following constituents:
Sodium Sulfide ($Na_2S$): 0.70 gm
L-Leucine: 1.50 gm
L-Serine HCl: 1.50 gm
L-Arabinose: 0.20 gm
Glucose: 0.45 gm
Water: 4.00 gm The molar ratio of sulfur to monosaccharide is approximately 3:1.

The mixture is heated to 115° C. under reflux for 1 hour. Following reaction the pH of the reaction is adjusted to between 5.5 and 6.0 using sodium hydroxide. The resulting flavorant has the aroma and flavor of freshly roasted chicken skin.

EXAMPLE 10

A dark meat chicken flavorant is prepared from a reaction mixture including the following constituents:

L-Cysteine HCl: 3.00 gm
L-Leucine: 1.50 gm
L-Serine: 1.50 gm
L-Arabinose: 0.25 gm
Glucose: 0.50 gm
Water: 4.00 gm
Chicken Fat: 3.00 gm The mixture is heated to 100° C. for 1 hour under reflux. Following reaction, the pH of the medium is adjusted to between 5.5 and 6.0 using sodium hydroxide.

The resulting flavorant imparts a heavy, fatty chicken aroma and flavor similar to dark chicken meat.

EXAMPLE 11

This Example illustrates the use of the tripeptide, glutathione, as the required sulfur-containing compound in the reaction.

The following constituents were reacted at 100° C. for ½ hours under reflux at an initial pH of 4.5:

Glutathione: 9.00 gm
L-Leucine: 1.50 gm
L-Arabinose: 0.20 gm
Glucose: 0.45 gm
Water: 5.00 gm Following the reaction, the pH was adjusted to between 5.5 and 6.0 using sodium hydroxide.

The resulting flavorant had the aroma and flavor of freshly baked white chicken meat.

I claim:

1. A process for making a chicken flavorant comprising reacting
   (a) a saccharide selected from the group consisting of reducing monosaccharides, reducing disaccharides, and combinations thereof,
   (b) at least 0.5 parts by weight of leucine and/or its salts per part by weight of said saccharide, and
   (c) an active sulfur-containing substance in an amount which provides more than 2 moles but not more than about 7 moles of active sulfur per mole of said saccharide,
in a reaction mixture including a hydroxylated solvent.

2. A process as claimed in claim 1, wherein said saccharide is selected from the group consisting of reducing monosaccharides and combinations thereof.

3. A process as claimed in claim 2, wherein said sulfur-containing substance provides about 3 moles to about 6 moles of active sulfur per mole of said monosaccharide.

4. A process as claimed in claim 3, wherein said sulfur-containing substance provides about 4 moles to about 5 moles of active sulfur per mole of said monosaccharide.

5. A process as claimed in claim 2, wherein said sulfur-containing substance is selected from the group consisting of cysteine and/or its salts, cystine and/or its salts and combinations thereof.

6. A process as claimed in claim 2, wherein from about 1.5 to 2.5 parts by weight of leucine and/or its salts are reacted in said mixture per part by weight of said monosaccharide.

7. A process as claimed in claim 2, wherein serine and/or its salts is reacted in said mixture.

8. A process as claimed in claim 2., wherein the reaction is carried out at a temperature from about 50° C. to about 130° C. for a period of from about 0.5 to 4.0 hours, at a pH from about 1 to about 8.

9. A chicken flavorant comprising the product of a process as claimed in any of claims 1-8.

10. A chicken flavorant as claimed in claim 9, further comprising chicken fat and a protein hydrolysate.

* * * * *

UNITED STATES PATENT AND TRADEMARK OFFICE
CERTIFICATE OF CORRECTION

PATENT NO. : 4,592,917

DATED : June 3, 1986

INVENTOR(S) : John Tandy

It is certified that error appears in the above—identified patent and that said Letters Patent is hereby corrected as shown below:

Column 3, line 40, "allium or cruciferae" should read -- *Allium* or *Cruciferae* --.

Column 9, line 32, "½ hours" should read -- 1½ hours --.

Signed and Sealed this

Twenty-sixth Day of August 1986

[SEAL]

Attest:

DONALD J. QUIGG

Attesting Officer

Commissioner of Patents and Trademarks